(12) United States Patent
Buban et al.

(10) Patent No.: US 8,694,464 B2
(45) Date of Patent: Apr. 8, 2014

(54) FILE SYSTEM NODE UPDATES

(75) Inventors: Garret J. Buban, Carnation, WA (US); Jonathan M. Cargille, Seattle, WA (US); William R. Tipton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 595 days.

(21) Appl. No.: 12/555,817

(22) Filed: Sep. 9, 2009

(65) Prior Publication Data

US 2011/0055184 A1 Mar. 3, 2011

Related U.S. Application Data

(63) Continuation of application No. 12/552,294, filed on Sep. 2, 2009, now Pat. No. 8,495,044.

(51) Int. Cl.
*G06F 17/30* (2006.01)

(52) U.S. Cl.
USPC ............................ 707/613; 707/704; 719/314

(58) Field of Classification Search
USPC ........... 707/613, 674, 704, 999.002, 999.008; 719/314, 318
See application file for complete search history.

(56) References Cited

U.S. PATENT DOCUMENTS

| | | | |
|---|---|---|---|
| 6,023,706 A | 2/2000 | Schmuck et al. | |
| 6,119,151 A | 9/2000 | Cantrell et al. | |
| 6,564,215 B1 * | 5/2003 | Hsiao et al. ............................ 1/1 | |
| 6,754,666 B1 | 6/2004 | Brookler et al. | |
| 7,243,142 B2 * | 7/2007 | Poirot et al. ................... | 709/220 |
| 7,249,314 B2 | 7/2007 | Walker et al. | |
| 7,302,634 B2 * | 11/2007 | Lucovsky et al. .............. | 715/200 |
| 7,401,089 B2 | 7/2008 | Benton et al. | |
| 7,403,945 B2 * | 7/2008 | Lin et al. ............................... 1/1 | |
| 7,430,615 B2 * | 9/2008 | Blackmore et al. ........... | 709/245 |
| 7,555,527 B1 * | 6/2009 | Slaughter et al. .............. | 709/213 |
| 7,739,240 B2 * | 6/2010 | Saito et al. ..................... | 707/634 |
| 2004/0039962 A1 | 2/2004 | Ganesh et al. | |
| 2004/0177099 A1 | 9/2004 | Ganesh et al. | |
| 2005/0065986 A1 | 3/2005 | Bixby et al. | |
| 2005/0091287 A1 | 4/2005 | Sedlar et al. | |
| 2005/0234989 A1 | 10/2005 | Bailey et al. | |

(Continued)

OTHER PUBLICATIONS

Helmer, et al., "Lock-based Protocols for Cooperation on XML Documents", retrieved at <<http://209.85.229.132/search?q=cache:gjDuexctoJAJ:pi3.informatik.uni-mannheim.de/publications/TR-03-006.ps+lok+leaf+node+in+%22file+system%22& cd=9&hl=en&ct= clnk&gl=in>>, Jun. 2003, pp. 1-15.

(Continued)

*Primary Examiner* — Leslie Wong
(74) *Attorney, Agent, or Firm* — John Jardine; Micky Minhas

(57) ABSTRACT

For each of one or more existing nodes in a file system, pending notifications of updates that have been performed on the node can be identified and sent to one or more other nodes. The file system can be opened for use, and one or more other nodes can be updated in response to the pending notifications while the file system is open for use. For example, this may be done in an operation for recovering from a crash of the file system. Also, a process for dealing with stale data in container nodes in a file system can include processing access requests according to a stale data scheme.

17 Claims, 11 Drawing Sheets

(56) References Cited

U.S. PATENT DOCUMENTS

2007/0050392 A1* 3/2007 Shukla et al. ................ 707/102
2007/0186157 A1 8/2007 Walker et al.
2009/0125882 A1 5/2009 Frigo et al.

OTHER PUBLICATIONS

Latham, et al., "Implementing MPI-IO Shared File Pointers without File System Support", retrieved at <<http://www.mcs.anl.gov/~thakur/papers/shared-fp.pdf>>, listed on linking page at <<http://www.mcs.anl.gov/~thakur/papers/>> as published Sep. 2005, pp. 10.

Zhao, et al., "Research on the Distributed Parallel Spatial Indexing Schema Based on R-Tree", retrieved at <<http://209.85.229.132/search?q=cache:pn7x2_F0ph8J:www.isprs.org/congresses/beijing2008/proceedings/2_pdf/13_SS-15/03.pdf+database+%2B+tree+%2B+parallel+update+nodes+locks&cd=9&hl=en&ct=clnk&gl=in>>, The International Archives of the Photogrammetry, Remote Sensing and Spatial Information Sciences. vol. XXXVII. Part B2. Beijing 2008, pp. 1113-1118.

Lauer, et al., "On the Duality of Operating Systems Structures" in Proc. Second International Symposium on Operating Systems, IR1A, Oct. 1978, reprinted in Operating Systems Review, 13, Apr. 2, 1979, pp. 3-19.

"GFS Project Page", retrieved at <<http://sources.redhat.com/cluster/gfs/>>, Jul. 30, 2009, pp. 2.

"Implementing MPI-IO Shared File Pointers With Linking Page", retrieved at<<http://www.mcs.anl.gov/~thakur/papers/>>, " Rajeev Thakur's Publications", Sep. 8, 2009, pp. 19.

Non-Final Office Action in co-pending U.S. Appl. No. 12/552,294, electronic notification date Dec. 27, 2011, 18 pages.

Final Office Action, U.S. Appl. No. 12/552,294, electronic notification date Jun. 25, 2012, 17 pages.

Buban, et al., "Extending File System Namespace Types", U.S. Appl. No. 13/947,632, filed Jul. 22, 2013, 45 Pages.

* cited by examiner

FILE SYSTEM NODE UPDATES

RELATED APPLICATIONS

This application is a continuation of U.S. application Ser. No. 12/552,294, entitled FILE SYSTEM, filed on Sep. 2, 2009, which is incorporated herein by reference.

BACKGROUND

Current mainstream file systems organize files in storage by name in a directory tree structure. This creates many parent-child relationships between files and directories. Manipulating files and directories within this tree often involves acquiring multiple locks for each manipulation. Such locks are typically acquired to assure that updates are performed atomically. For example, moving a file from one directory to another typically includes acquiring three locks: one for the file itself, and one for each of the directories. Those three locks are held while the update operation is performed, including updates to the file and updates to the two directories.

File systems in which a manipulation can involve acquiring multiple locks typically use a lock hierarchy and/or deadlock detection. For example, if a file is to be moved from directory A to directory B and a different file is to be moved from directory B to directory A, the file system typically has rules in place to ensure these two operations do not deadlock with each other if they are attempted at the same time. Such rules can prevent or resolve deadlock situations, such as where one operation has acquired a lock of directory A and the other has acquired a lock of directory B, so that neither operation can proceed because neither can obtain locks of both directories.

Some file systems allow data to be organized and indexed by a finite number of attributes other than names. For example, some file systems allow data to be organized and indexed by multiple attributes, such as by name and by object identifier.

SUMMARY

Whatever the advantages of previous file systems, they have neither recognized the tools and techniques described and claimed herein, nor the advantages produced by such tools and techniques.

The tools and techniques can include lock independent updates of multiple nodes in a file system. As used herein, a node is a data structure in a file system that can represent a file (a file node) and/or a collection of one or more other nodes (a container node). A container node can include an index of one or more attributes of one or more file nodes and/or other collection nodes. It may also be possible for a node to be a file node and a container node, where the node represents a file and can also index one or more other nodes.

In one embodiment, the tools and techniques can include acquiring a lock of a first node in a file system, performing an update of the first node while the lock of the first node is held, and releasing the lock of the first node. Similarly, the tools and techniques can include acquiring a lock of a second node in the file system, performing an update of the second node while the lock of the second node is held, and releasing the lock of the second node. The update of the second node can reflect the update of the first node. The updates of the first and second nodes can be done in response to a single request to the file system, but the update of the first node can be independent of acquiring the lock of the second node. Updating a node is independent of acquiring a lock of another node if the update of the first node can be performed whether or not the lock of the second node can be acquired at that time.

Another embodiment of the tools and techniques can include performing a first update operation in a file system, where the first update operation includes updating a container node in the file system (possibly in addition to updating other nodes). A second update operation can also be performed in the file system, where the second update operation includes updating the same container node (again, possibly in addition to updating other nodes). The file system can allow performance of the first update operation and the second update operation in parallel. For example, the first update operation can include updating the container node and a first contained node that is contained in the container node, and the second update operation can include updating the container node and a second contained node that is contained in the container node. As an example, the updates of the first contained node and the second contained node can be allowed to proceed in parallel.

As used herein, multiple update operations are allowed to be performed in parallel if at least some portion of the updating for the operations can overlap in time. For example, if one update operation includes updating a first contained node and a container node, and a second update operation includes updating a second contained node and the same container node as in the first operation, then the two operations are allowed to be performed in parallel if the first and second contained nodes can be updated at the same time. Similarly, multiple update operations are actually performed in parallel if at least some portion of the updating actually overlaps in time.

In yet another embodiment of the tools and techniques, nodes in a file system can be managed within one or more existing namespace types. Additionally, while the file system is running, one or more additional namespace types can be defined, and the file system can be extended to manage nodes within the one or more additional namespace types. As used herein, a namespace is a conceptual space that groups or organizes one or more nodes based on attributes of those nodes. A namespace type is a namespace organization based on a set of one or more attribute types. For example, a namespace type may index nodes based on node names. As another example, a different namespace type may index nodes based on node size (file size, directory size, etc.). Another different namespace type may index nodes based on node creation date stamps and last-modified date stamps. Yet another different namespace type may index music nodes related to music files by artist name, album title, song title, and/or other attributes related to the music. As used herein, managing nodes within namespace types means using the namespace types, which have been identified in a file system, to manage access and modifications to any nodes that have been organized according to those namespace types.

In yet another embodiment of the tools and techniques, an update request can be received at a file system. In response to the request, an update of a contained node can be performed without locking a container node that contains the contained node. A notification of the update of the contained node can be sent to the container node. A request for access to data at the container node can be received before the container node has processed the notification. The request for access can be processed according to a pre-determined scheme. Processing of the request for access can begin after the container node has received the notification but before the container node has processed the notification.

In yet another embodiment of the tools and techniques, a file system can be closed to use, and for each of one or more existing nodes in the file system, pending notifications of updates that have been performed on the node can be identified and sent to one or more other nodes. The file system can be opened for use, and one or more other nodes can be updated in response to the pending notifications while the file system is open for use.

In yet another embodiment of the tools and techniques, a recovery operation can be performed in a file system after a crash of the file system. The recovery operation can include, for each of a plurality of nodes in the file system, determining whether the node has one or more pending notifications of that node's updates. If so, then the one or more pending notifications can be sent to one or more other nodes. The file system can be opened for use after sending the pending notifications, if any. After opening the file system for use, in response to one or more of the pending notifications, one or more indexes in the one or more other nodes can be updated.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
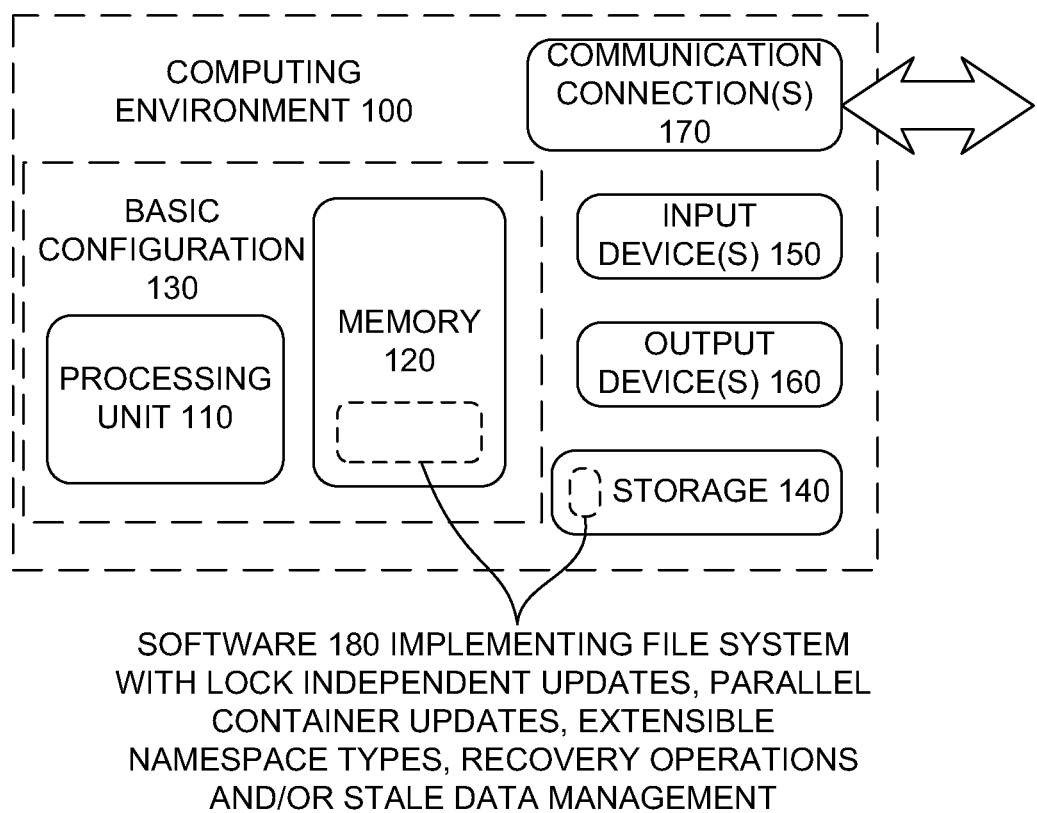
FIG. 1 is a block diagram of a suitable computing environment in which one or more of the described embodiments may be implemented.

Embodiments described herein are directed to techniques and tools for improved file system management. Such improvements may result from the use of various techniques and tools separately or in combination.

Current locking rules that deal with deadlock, such as those discussed above, can greatly increase the complexity of the file system. Even more complexity can result if the file system allows the data to be organized and indexed by multiple types of namespaces. As additional namespace types are allowed, the problem can quickly become unmanageable. As such, additional types of namespaces such as thumbnail directories are typically handled separately by layers above the file system.

Current locking models also tend to cause a great deal of contention for locks of parents or containers. This can severely limit the scalability of the system. For example, if two operations to update different files must both update the same parent, these operations typically need to happen in series. If this example is multiplied by millions of files, operations that update the parent or parents can become a major detriment to file system performance.

In the tools and techniques described below, each node can have its own lock, and updates can be performed independent of locks on other nodes, even in situations where one update operation involves updating multiple nodes (e.g., parent or container nodes and child or contained nodes). Rather than locking all nodes that are affected by an update operation for the entire operation, each node can be locked while it is updated, and messages can be sent to other nodes that also need to be updated so those nodes can update separately. This can simplify locking rules. Such simplification can make it easier to allow additional types of namespaces to be managed by a file system, even while the file system is running (although such additional types may be allowed without using lock independent updates, such as by using algorithms to extend locking rules to account for the additional namespaces). Additionally, lock independent updates of nodes can make it easier to allow multiple operations that update the same container node to be run in parallel because other nodes can be updated at the same time without locking the container node.

Accordingly, the tools and techniques described herein can improve performance, flexibility, and/or scalability of a file system. However, the subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts may not show the various ways in which particular techniques can be used in conjunction with other techniques.

I. Exemplary Computing Environment

FIG. 1 illustrates a generalized example of a suitable computing environment (100) in which one or more of the described embodiments may be implemented. For example, one or more such computing environments can host a file system with lock independent updates, parallel container updates, and/or extensible namespace types. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing a file system with lock independent updates, parallel container updates and/or extensible namespace types.

Although the various blocks of FIG. 1 are shown with lines for the sake of clarity, in reality, delineating various components is not so clear and, metaphorically, the lines of FIG. 1 and the other figures discussed below would more accurately be gray and fuzzy. For example, one may consider a presentation component such as a display device to be an I/O component. Also, processors have memory. The inventors hereof recognize that such is the nature of the art and reiterate that the diagram of FIG. 1 is merely illustrative of an example of a computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "update," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. File System Environment

A. File System Structure

Figure 2:
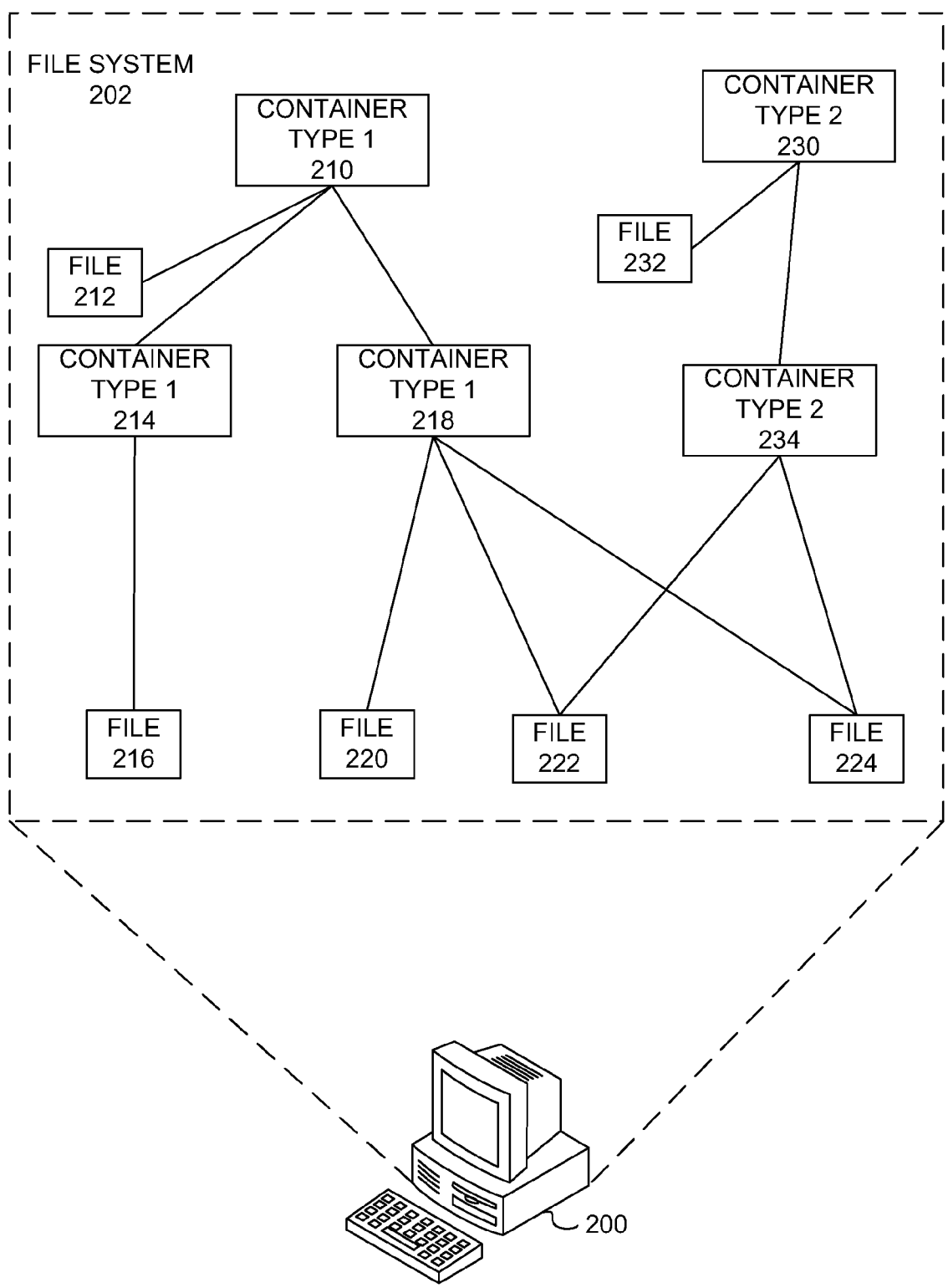
FIG. 2 is schematic diagram of a computing environment that includes a file system.

Referring now to FIG. 2, a file system computing environment (200) will be described. The file system environment (200) can include one or more computing environments such as the computing environment (100) described above or some other computing environment(s). The file system environment (200) can include a file system (202) with multiple file system nodes. For example, the file system (202) can include a root container node (210) that is a first type of container node, or in other words a container node that can index one or more other contained nodes based on a first type of namespace. For example, the first type of namespace may be based on one or more node attributes such as the name of the node (file name, directory name, etc.). The root container node can contain a file (212) and can also contain another container node (214), which can in turn contain a file node (216). The root container node (210) can also contain another container node (218), which can contain three file nodes (220, 222, and 224).

In addition, the file system (202) can include a root container node (230) that is a second type of container node, or in other words a container node that can index one or more other contained nodes based on a second type of namespace. For example, the second type of namespace may be based on one or more node attributes, such as node size. The root container node (230) can contain a file node (232) and another container node (234). That container node (234) can in turn contain a pair of file nodes (222 and 224). The pair of file nodes (222 and 224) can have multiple parent container nodes (218 and 234) that are multiple parent types within multiple different types of namespaces.

B. Node Structure

Figure 3:
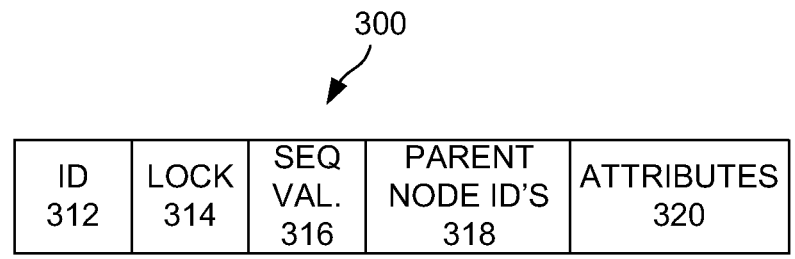
FIG. 3 is a schematic diagram of a file system node.

Referring now to FIG. 3, some possible parts of a node (300) will be discussed. The node (300) may be a file node or a container node. The node (300) can include an identifier (312), which can be different from the identifiers for other nodes in the file system.

The node (300) can also include a lock (314), which can be one or more bits that can indicate whether a lock is being held for the node (300) (i.e., whether the node is locked), and what type of lock is being held. For example, the lock being held may be a shared lock, which would prohibit other operations from writing to or modifying the node (300), but would not prohibit reading or accessing the node (300). Or, the lock being held may be an exclusive lock, which would prohibit all other read and write operations on the node (300) while the lock is being held.

In addition, the node (300) can include a sequence value (316), which can be changed each time the node (300) is modified. The sequence value (316) need not be a pure number, but could be an alpha-numeric string, an alpha string, a numerical string, etc. In any event, the sequence value can be altered when the node (300) is modified to assist other nodes in determining whether the node (300) has been updated since those nodes last received an update. As an example, the sequence value (316) may be a numerical string that is incremented by one each time the node (300) is modified. Use of the sequence value will be discussed in more detail below.

The node (300) can also include a list (318) of parent node identifiers. The list (318) can be the identifiers (like the identifier (312) of the node (300)) of the nodes that are currently indexing the node (300), or in other words, the parent or container nodes for which the node (300) is a child or contained node. Accordingly, it should be noted that a node can be both a container node (if it indexes other nodes) and a contained node (if it is indexed by other nodes). The node (300) can also include additional attributes (320) of the node (300), such as time stamps, node size, indexes (for container nodes), and/or data (for file nodes).

Figure 4:
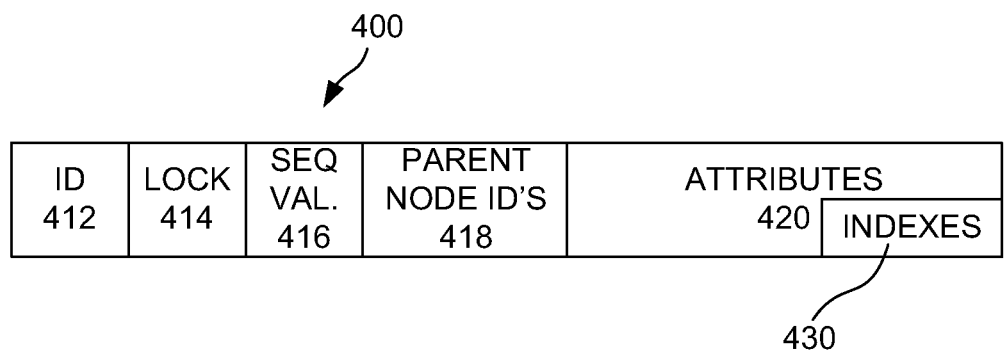
FIG. 4 is a schematic diagram of a container file system node.

Referring to FIG. 4, some possible parts of a container node (400) will be discussed. The container node can include an identifier (412), lock (414), sequence value (416), list (418) of parent node identifiers, and attributes (420). The attributes (420) can include indexes (430). Entries in the indexes (430) can include one or more identifiers and one or more entries that represent a set of one or more attributes of contained nodes, with the types of attributes included in the index corresponding to the namespace(s) that the container node is using for indexing.

III. File System Techniques

A. File Finding and Lock Independent Updating Technique

Figure 5:
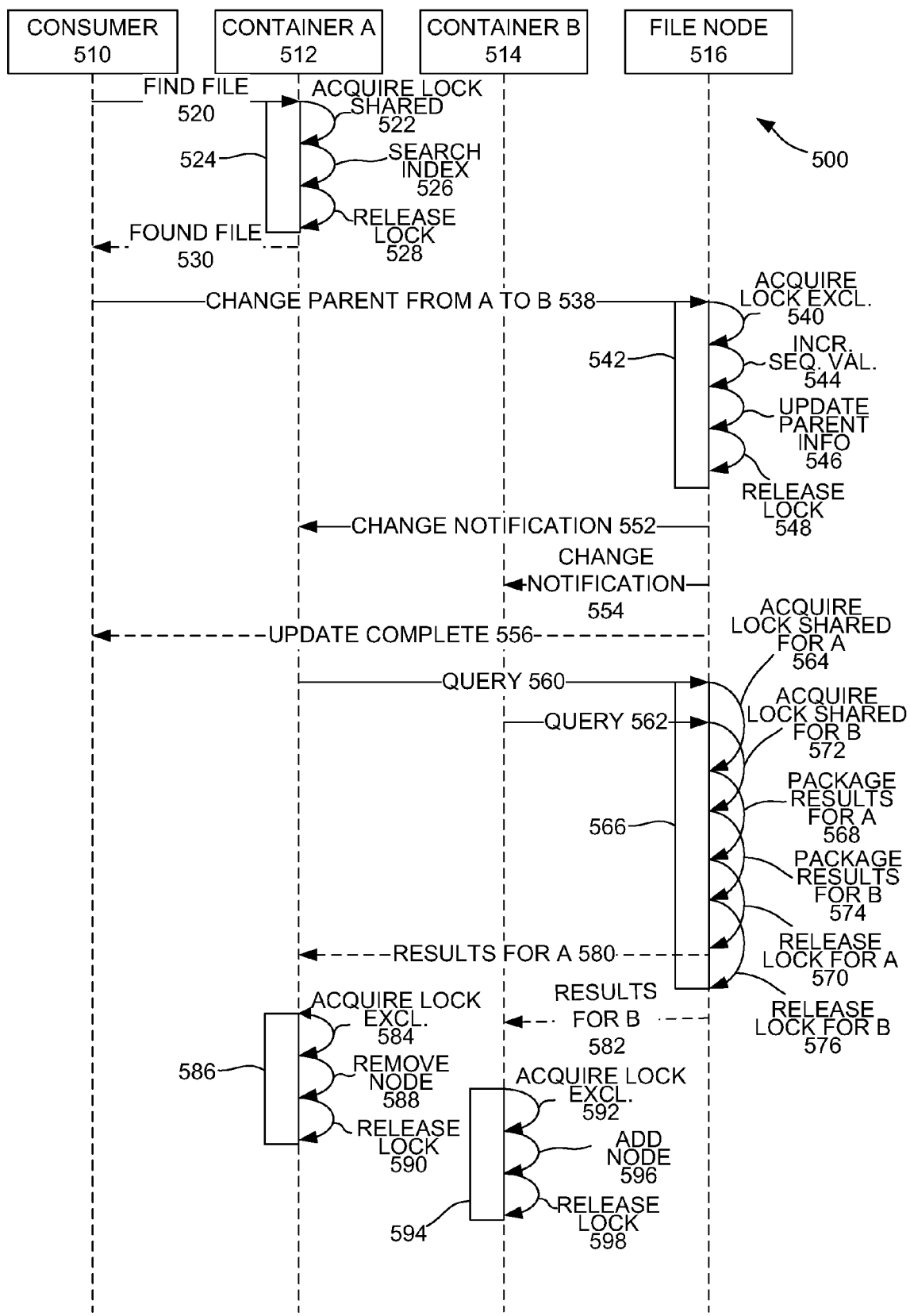
FIG. 5 is a schematic diagram illustrating a technique for finding of a file and a technique for updating a file and its parents in a file system.

Referring to FIG. 5, a file finding and updating technique will be described. It should be appreciated that this technique for moving a file node from one container to another is provided as an example, but the technique can be applied to other types of update and access operations, such as renaming contained nodes, adding contained nodes, adding container nodes, etc. The technique can include performing acts in and sending messages (notifications, data, etc.) between a consumer (510), a container node A (512), a container node B (514), and a file node (516).

The consumer (510) could be any of multiple different software and/or hardware devices. For example, the consumer (510) could be a user interface device, such as a display that accepts user input (e.g., a touch screen) or the combination of a display and a user input device. Alternatively, the consumer (510) could be a software module that is configured to interact with nodes in a file system (500) that includes container node A (512), container node B (514), and the file node (516).

The messages that are sent between the consumer (510) and the nodes (512, 514, and 516), as well as between the nodes (512, 514, and 516) can take various forms and be transmitted via various different computing communications devices. For example, the messages may be sent between different modules of the file system (500) within one computing device, or between different computing devices in a networked computing configuration. Moreover, while the discussion refers to the nodes (512, 514, 516) and the consumer (510) sending and receiving messages and performing other actions, it is to be understood that these actions and others described herein can be performed by one or more processors executing stored instructions, such as instructions provided by the file system (500), other parts of an operating system that may include the file system (500), and/or other programs running on such an operating system.

In the technique, the consumer (510) can send a find file request message (520) to container node A (512). The find file request message (520) can be a message requesting container node A (512) to find one or more specified files. In response to the find file request message (520), a shared lock can be acquired (522) for container node A (512), and the lock can be held for a time period (524). The index of container node A (512) can be searched (526) for the requested file while the lock is held. After the search, the lock can be released (528), and container node A (512) can send a message (530) back to the consumer (510), indicating that the file was found.

The consumer (510) can also send a message (538) requesting that a parent for the file node (516) be changed from container node A (512) to container node B (514). In response, an exclusive lock of the file node (516) can be acquired, and the lock can be held for a period of time (542). During the period of time (542), a sequence value for the file node (516) can be changed such as by being incremented (544), and parent information for the file node (516) can be updated (546). For example, a list of parent node identifiers at the file node (516) can be updated by deleting an identifier for container node A (512) and adding an identifier for container node B (514). The lock of the file node (516) can then be released (548), ending the period of time (542) for the lock to be held.

While the update operation requested by the customer (510) includes making changes to the parent nodes (container node A (512) and container node B (514)) for the file node (516), the lock of the file node (516) can be acquired and the file node (516) can be updated independent of whether locks for container node A (512) and container node B (514) can also be obtained. Accordingly, locking rules can be simplified for the file system (500), as compared to locking rules for many existing file systems.

After the lock of the file node (516) is released, a change notification message (552) can be sent to container node A (512) and another change notification message (554) can be sent to container node B (514), notifying the container nodes that a change has been made. In some implementations, the change notification messages (552 and 554) can be sent only to parent containers that are affected by the change (i.e., those that are indexing on the attribute that has changed—here a portion of the list of parent identifiers), and the notification messages (552 and 554) may also indicate what change has been made to the file node (516). Indeed, each attribute could have its own sequence value, and only containers indexing attributes that were updated could be notified. However, in the implementation illustrated in FIG. 5, the change notification messages (552 and 554) can be sent to all parents of the file node (516) and they need not describe the change. When the change notifications are received by container node A (512) and container node B (514), the container nodes can each send back a message confirming receipt of the respective change notification messages (552 and 554). The file node (516) can log the change being made, and can log that the change notification messages were sent and received.

After the change notification messages (552 and 554) are sent, the file node (516) can send a message (556) to the consumer (510), indicating that the update is complete. Indeed, the update can be considered to be complete because each node can be considered to be the authoritative source of information about who that node's parents are. However, the update in the file node (516) can also be reflected in the index information at each affected container node that is indexing the updated attribute.

Accordingly, container node A (512) and container node B (514) can each send to the file node (516) a respective query message (560 and 562), which queries the file node (516) for its current state, such as querying for current attributes that are indexed by that container node. A container node can send a query message immediately after receiving a change notification message. However, if the container node is busy, the container node may wait until a more convenient time to send the query message, and also may wait for a convenient time to update its own indexes. In other words, the updates to the parent container nodes can be done in a lazy manner, although they can still considered to be done in response to the messages (538, 552, 554) from the consumer (510) to the file node (516) and from the file node (516) to the container nodes (512 and 514).

In response to receiving the query message (560) from container node A (512), a shared lock of the file node (516) can be acquired (564) for container node A (512). The shared lock can be held during a period of time (566). (As will be seen, in the particular situation illustrated, that period of time will last until shared locks for container node A (512) and container node B (514) are released.) While the lock for container node A (512) is held, the results for container node A (512) can be packaged (568). This packaging (568) can include compiling a list of the current attributes, which were requested by container node A (512), as well as the current sequence value for the file node (516). The lock for container node A (512) can be released (570) once the results are packaged.

Similarly, a shared lock of the file node (516) can be acquired (572) for container node B (514). While the lock for container node B (514) is held, the results for container node B (514) can be packaged (574). The lock for container node B (514) can be released (576) once the results are packaged, thus ending the period of time (566) of holding the shared lock of the file node (516).

Even before the end of the period of time (566) of the lock of the file node (516) (but in some implementations after the lock for container node A (512) is released (570)), the file node (516) can send the results (580) to container node A (512). After the results (580) for container node B (514) are packaged (574) for container node B (514) and in some implementations after the lock for container node B (514) is released, the file node (516) can send the results (582) to container node B (514).

In response to receiving the results (580), container node A (512) can compare the sequence value for the file node (516) that was returned with the results (580) with the most recent stored sequence value that container node A (512) has from previous results that container node A (512) received from the file node (516). Alternatively, the container node could request and receive the contained node's (here, the file node (516)) sequence value prior to requesting any update information.

In either case, in the event of sequence values being incremented with each update, if the sequence value received from a contained node is higher than the sequence value the container node has stored for the contained node, then this indicates that the contained node has updated its attributes since the container node last received the attributes from the file node. Accordingly, in this situation the container node will update its own information and re-index the file node.

If the received sequence value and the sequence value already stored at the container node are the same, then the container node can ignore the change notification from the contained node because the contained node will not have updated its information since the container node last received information from the contained node. For example, this could happen if the container node received two packages of results from the contained node, and re-indexed using the later-sent package before examining the earlier-sent package.

If the sequence value received from the contained node is lower than the sequence value already stored at the container node, then this indicates an invalid state. However, the contained node can be assumed to have the correct data, and the container node can log an error and re-index using the received results.

If container node A (512) determines that it should re-index, then an exclusive lock can be acquired (584) on container node A (512) and the lock can be held during a period of time (586). During the period of time (586), information for the file node (516) can be removed (588) from container node A's (512) indexes. The lock on container node A (512) can then be released (590).

Likewise, if container node B (514) determines that it should re-index, then an exclusive lock can be acquired (592) on container node B (514) and the lock can be held during a period of time (594). During the period of time (594), the information for the file node (516) can be added (596) to container node B's (514) indexes. The lock on container node B (514) can then be released (598).

As is illustrated in FIG. 5, the file system (500) can allow the file node (516) to package the results for container node A (512) and container node B (514) in parallel because the packaging can be done without writing to the file node (516), so shared locks are sufficient. Additionally, container node A (512) and container node B (514) can be updated in parallel because those updates do not include locking the file node (516), even though the overall update operation does include acquiring (540) an exclusive lock of the file node (516). This parallelism can improve performance. In addition, because locks of multiple nodes do not need to be acquired and held at the same time, deadlock is not a problem, and the file system (500) can be simplified by excluding deadlock prevention and resolution rules. This can allow the file system (500) to be more easily scaled and more easily extended to allow and incorporate multiple types of namespaces and multiple types of parents indexing on those namespaces.

Because all the nodes involved in an update operation may not be locked during the entire update operation, containers can be queried while their state is stale (i.e., when a contained node has been updated but the container node has not yet been updated to reflect that update to the contained node). However, if all containers have acknowledged the need to update (by acknowledging the receipt of the change notification message) before informing a consumer that an update is complete, each container can know when it has the potential to return stale data because it will have received a change notification but will not have processed that notification. The containers can deal with this stale data issue in a number of ways, depending on the implementation. Some ways of dealing with this stale data issue include the following: (1) allow the container node to potentially return stale data; (2) have the container process all pending updates before returning search results, which could prevent stale data; and (3) have the container process all pending adds before returning search results, which could allow false positive results, but not false negatives. Other ways of dealing with stale data are also possible, such as combinations of the foregoing and/or other different ways. One or more of these or other ways of dealing with stale data can be implemented according to a stale data scheme that is followed when a request for access to stale data is received. For example, the file system could adjust stale data behavior based on search options, such as user-defined options.

The asynchronous nature of the container updates can allow for rapid recovery from crash situations. During recovery, each node can be responsible for ensuring its own integrity, including its own list of parents. This can be accomplished using standard logging techniques. In addition, a node can remember whether it has notified all containers of updates that have completed. Again, this can be done using standard logging techniques. Any notifications that were not confirmed as being received by the container can be resent during the recovery. Once each node in the file system has ensured its state is consistent and that it has notified all containers of its updates, the system can be opened for use. The containers can update their indexes while the system is functioning. This is in contrast to many existing file systems, where recovery techniques include verifying the entire index structure prior to opening the system for use.

B. Lock Independent Node Updating Techniques

Figure 6:
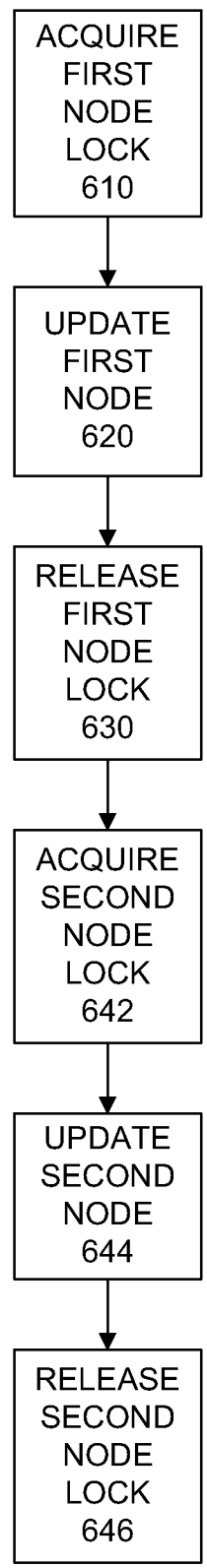
FIG. 6 is a flow diagram illustrating a technique for updating a pair of nodes in a file system.

Referring now to FIG. 6, a technique for updating a pair of nodes in a file system will be discussed. The technique can be performed in response to a request to the file system to perform a requested update. In the technique a lock of a first node in a file system can be acquired (610). An update of the first node can be performed (620) while the lock of the first node is held, and the lock of the first node can be released (630). A lock of a second node can also be acquired (642). Acquiring (610) the lock of the first node and performing (620) the update of the first node can be independent of acquiring (642) the lock of the second node. While the lock of the second node is held, an update of the second node can be performed (644) to reflect the update of the first node. Additionally, the lock of the second node can be released (646).

The first node can be a contained node, and the second node can be a container node, with the second node being a parent of the first node. Also, the locks of the first and second nodes can be exclusive locks.

Figure 7:
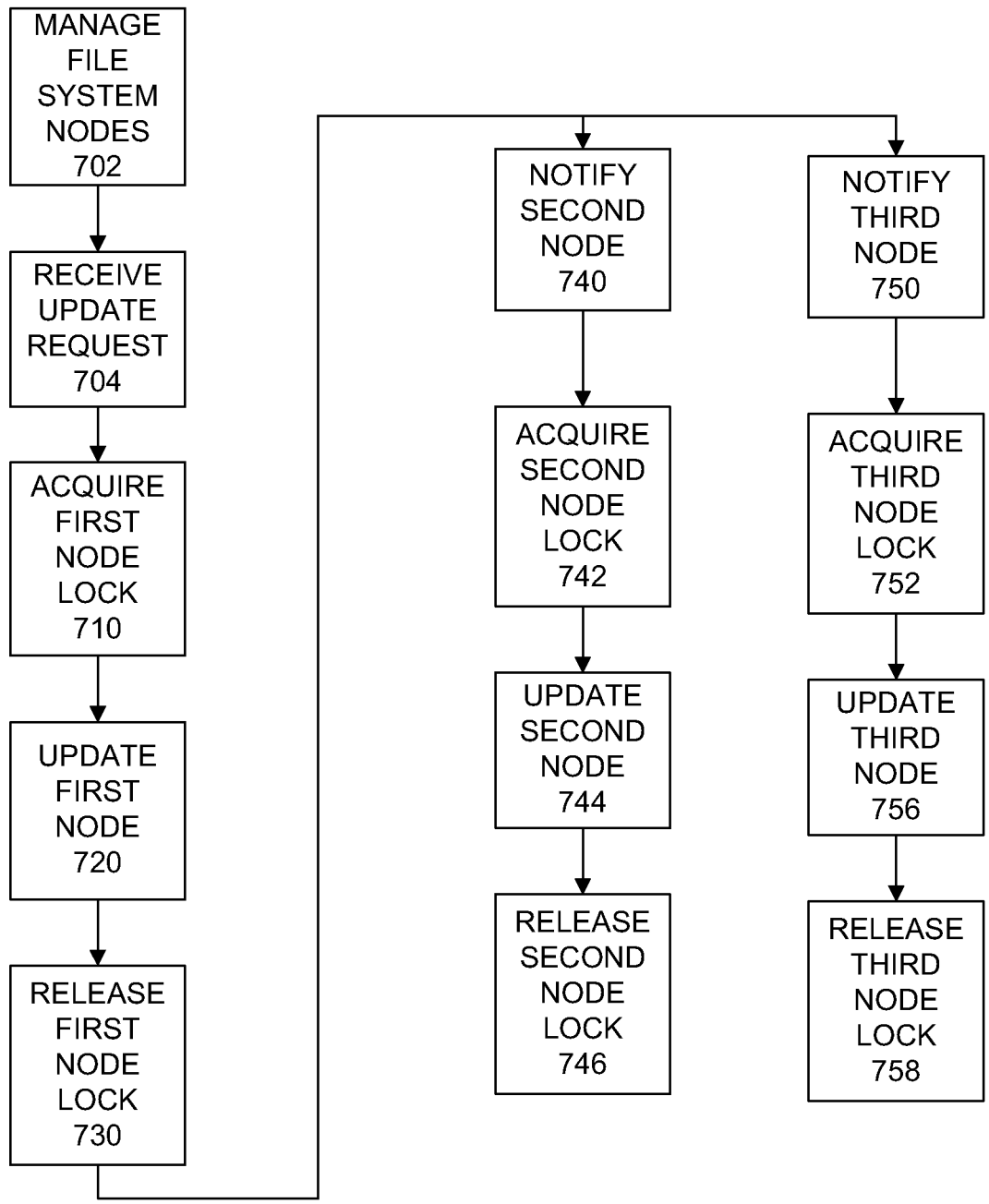
FIG. 7 is a flow diagram illustrating a technique for updating multiple nodes in a file system.

Referring now to FIG. 7, another technique for updating multiple nodes in a file system will be discussed. In the technique, multiple file system nodes, including a first node and a second node, can be managed (702) in a file system. An update request to perform a requested update can be received (704) at the file system. In response to the update request, a number of actions can be performed. Those actions can include acquiring (710) a lock of a first node in the file system, performing (720) an update of the first node while the lock of the first node is held, and releasing (730) the lock of the first node.

A second node in the file system can be notified (740) of the update of the first node, and in response a lock of the second node can be acquired (742), an update of the second node can be performed (744) to reflect the update of the first node, and the lock of the second node can be released (746). A third node in the file system can also be notified (750), and in response a lock of the third node can be acquired (752), the third node can be updated (756) to reflect the update of the first node, and the lock of the third node can be released (758).

Acquiring (710) the lock of the first node and performing (720) the update of the first node can be independent of acquiring (742 and 752) the locks of the second or third nodes, and acquiring (742 and 752) the locks of the second and third nodes and performing (744 and 756) updates of those nodes can be independent of acquiring (742 and 752) locks of the other of those nodes. The first node can be a contained node, and the first and second nodes can be container nodes that are or have been parents of the first node. The contained node can have one or more attributes that are indexed in the second and/or third nodes. The updates of the nodes can be updates of index entries that represent the one or more attributes.

The second and third nodes can be notified (740 and 750) after the lock of the first node is released (730). Also, the locks of the first node, the second node, and the third node can be exclusive locks.

Moreover, a response to the request can be sent after notifying (740 and 750) (such as after sending notifications and possibly after receiving a confirmation that the notifications were received by the second and third nodes), but the response may be sent without waiting for the updates (744 and 756) of the second and third nodes to be completed. Nevertheless, the response can indicate that the requested update is complete. The file system can allow acquiring (742 and 752) the lock of the second and/or third node, performing the update (744 and 756) of the second and/or third node, and releasing (746 and 758) the lock of the second and/or third node to be performed as background operations. In this context, a background operation is one that a requester that sent the request does not need to wait for before the requester can proceed as if the requested update was completed.

C. Parallel Update Technique

Figure 8:
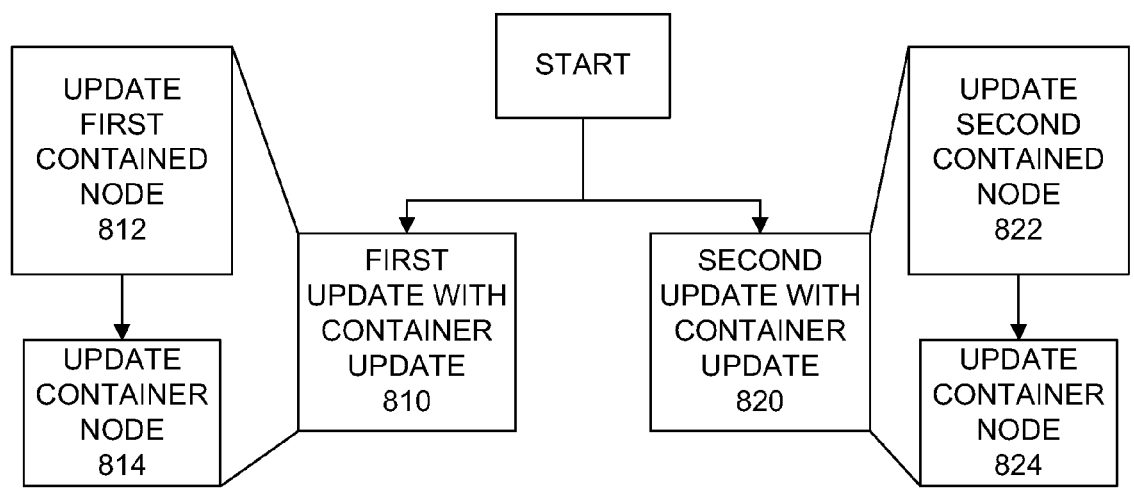
FIG. 8 is a flow diagram illustrating a technique for performing two update operations.

Referring now to FIG. 8, a technique for performing two update operations will be discussed. In the technique, a first update operation is performed (810) in a file system. The first update operation can include updating (812) a first contained node in the file system and updating (814) a container node in the file system that contains the first contained node. The technique can also include performing (820) a second update operation in the file system. The second update operation can include updating (822) a second contained node in the file system that is contained in same container node as is updated in the first update operation, and updating (824) the container node. The file system can allow the performance (810) of the first update operation and the performance (820) of the second update operation to be in parallel, which can include allowing the updating (812) of the first contained node and updating (822) of the second contained node to proceed in parallel. Accordingly, the performance (810) of the first update operation and the performance (820) of the second update operation can be done in parallel.

Each update operation can include a number of acts including the following: (1) acquiring a lock of the respective contained node; (2) performing an update of the respective contained node while the contained node is locked; (3) releasing the lock of the respective contained node; (4) notifying the container node that the contained node has been updated; (5) acquiring a lock of the container node (with the acquiring the lock of and updating the respective contained node being independent of acquiring the lock of the container node); (6) performing an update of the container node to reflect the update of the respective contained node while the lock of the container node is held; and (7) releasing the lock of the container node. Once the container node has been notified (act 4 above), the contained node can report that it has successfully updated, and the container node can act independent of the contained node to update on its own time.

D. Namespace Extension Technique

Figure 9:
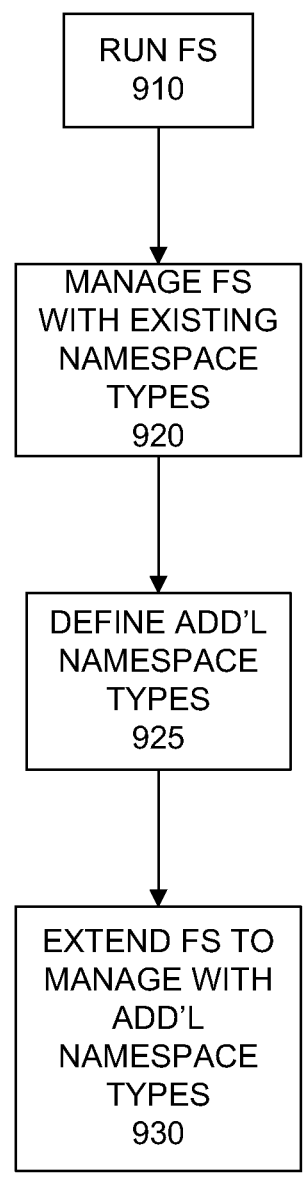
FIG. 9 is a flow diagram illustrating a technique for extending a file system to manage additional namespace types.

Referring now to FIG. 9, a technique for extending a file system to manage additional namespace types will be discussed. In the technique, a file system can be run (910). While the file system is running, the file system can be managed (920) within one or more existing namespace types, one or more additional namespace types can be defined (925), and the file system can be extended (930) to manage nodes within one or more additional namespace types. For example, the one or more existing namespace types and the one or more additional namespace types can be node names, timestamps, size, file contents, song title, artist name, and/or album title. The nodes managed by the file system can include at least one node that is contained in a first parent node that is a first parent type within a first namespace type, and a second parent node that is a second parent type within a second namespace type.

E. Stale Data Management Technique

Figure 10:
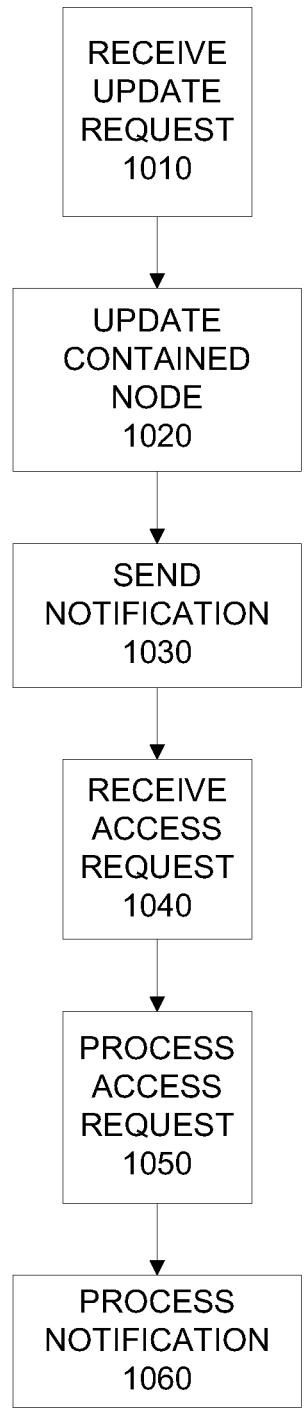
FIG. 10 is a flow diagram illustrating a technique for managing stale data in a file system.

Referring now to FIG. 10, a stale data management technique will be described. In the technique, an update request can be received (1010) at a file system. In response to the request, a contained node can be updated (1020) without locking a container node that contains the contained node. A notification of the update of the contained node can be sent (1030) to the container node. A request for access to data at the container node can be received (1040) before the container node has processed the notification. The access request can be processed (1050) according to a pre-determined scheme after the container node has received the notification but before the container node has processed the notification.

The scheme can dictate one or more of the following techniques: allowing the second node to return the data in response to the request for access before processing the notification; processing the notification at the second node before processing the request for access, regardless of characteristics of the notification; and processing notification before processing the request for access if processing the notification would add data to the second node. The scheme may not be limited to these techniques; rather, the scheme could include other techniques in addition to or instead of these techniques. Also, the scheme can be altered according to search options, such as in response to user input that sets search options.

The technique may include processing (1060) the notification, and processing the notification can include performing an update of the container node. Also, the update of the container node can reflect the update of the contained node.

F. Recovery Techniques

Figure 11:
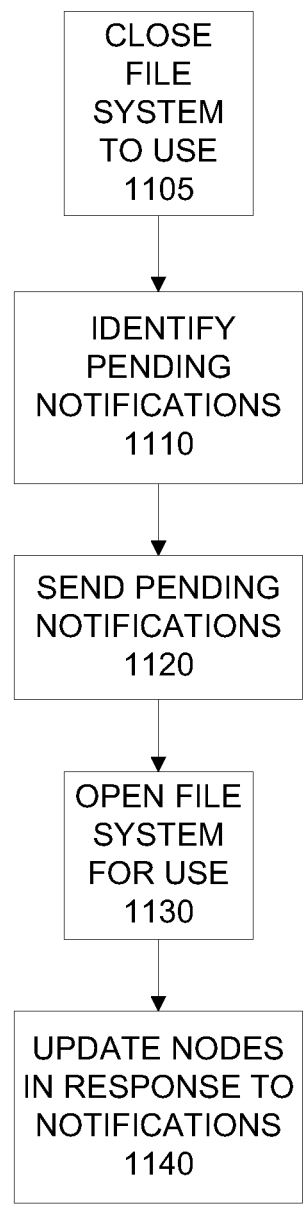
FIG. 11 is a flow diagram illustrating a technique for updating a file system.

Referring to FIG. 11, a file system updating technique will be described. This technique may be included in a file system recovery operation, such as an operation to recover after a file system crash. In the technique, a file system can be closed to use (1105). For each of one or more existing nodes in the file system, pending notifications of updates that have been performed on the node can be identified (1110). The pending notifications can be sent (1120) to one or more other nodes. Pending notifications are notifications that are scheduled to be sent, but have not yet been confirmed as having been received. Additionally, the file system can be opened for use (1130), and the one or more other nodes can be updated (1140) in response to the pending notifications. This updating (1140) of the one or more other nodes can be performed while the file system is open for use.

The technique can also include having each of the one or more existing nodes ensure its own integrity, such as having each existing node ensure its integrity after a file system crash using standard logging techniques. Having node(s) ensure their own integrity can be done while the file system is closed to use. Additionally, if one or more pending notifications were generated by an existing node, the identifying pending notifications for that node can include identifying the pending notifications that were generated by the existing node in ensuring its own integrity. Identifying pending notifications may also include identifying pending notifications that had been generated prior to a file system crash. Identifying the pending notifications and sending the pending notifications for each of the one or more existing nodes can be allowed to be done in parallel for different nodes, such as where sending notifications for a first node is allowed to be done in parallel with sending notifications for a second node. Updating the one or more other nodes can be allowed to be done in parallel for different nodes as well.

All pending notifications of updates performed on the one or more existing nodes can be sent prior to the file system being opened for use (1130), and identifying (1110) and sending (1120) the pending notifications can be performed while the file system is closed to use. The one or more existing nodes can include a contained node, and for that contained node, sending (1120) the one or more pending notifications to one or more other nodes can include sending the one or more pending notifications to one or more containing nodes that contain the contained node. Updating (1140) the one or more other nodes can include acquiring locks of those node(s).

Figure 12:
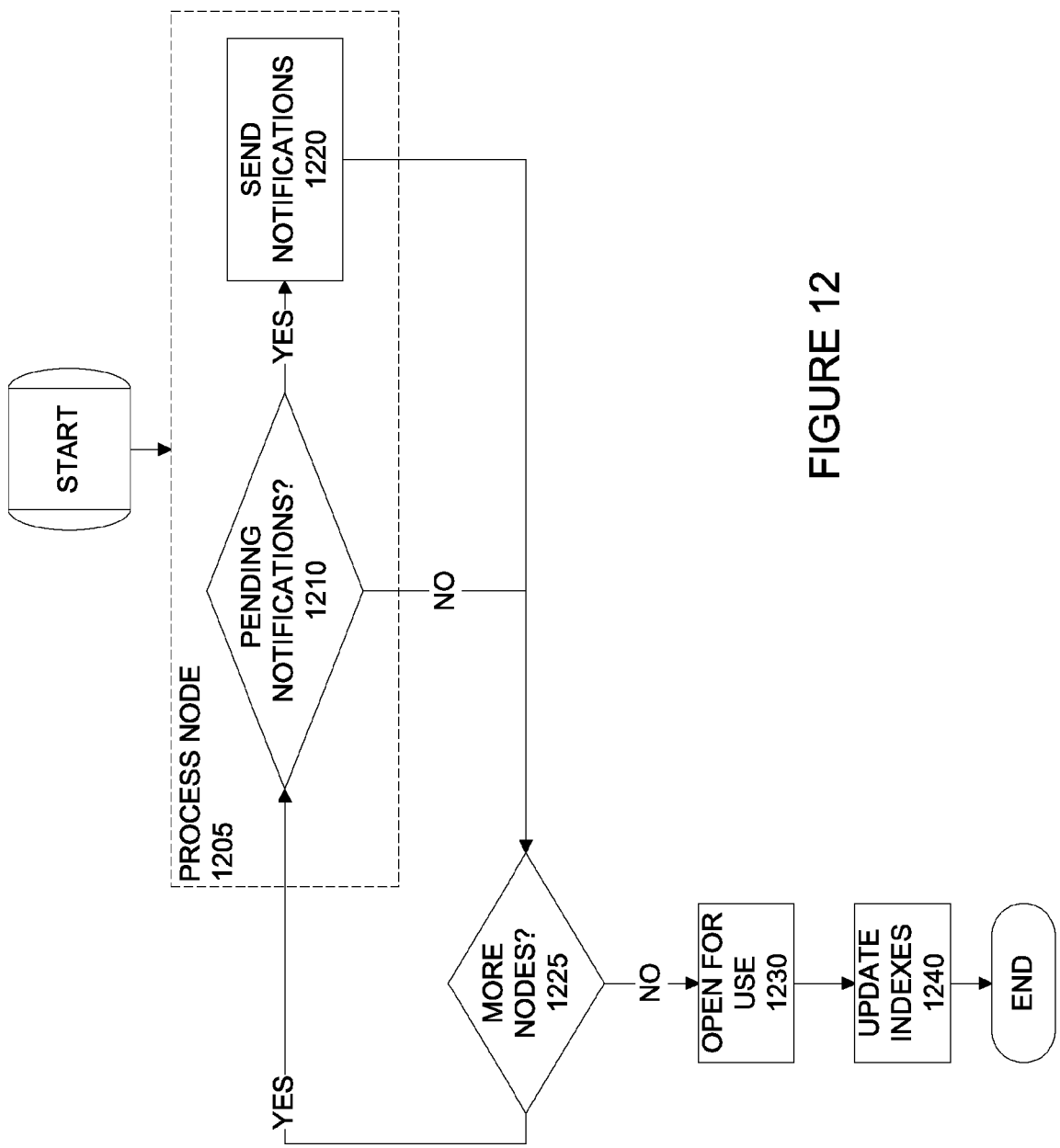
FIG. 12 is a flow diagram illustrating another technique for updating a file system.

Referring now to FIG. 12, another update technique, which can be used in recovering from a file system crash, will be described. In the technique, nodes of a file system can be processed (1205). The nodes can be processed in parallel and/or in series. For each node, it can be determined (1210) whether the node has one or more pending notifications of that node's updates. If so, then the one or more pending notifications can be sent (1220) to one or more other nodes. It can be determined (1225) whether additional nodes remain to be processed. When the pending notifications have been sent (1220) and no more nodes remain to be processed (1205), the file system can be opened for use (1230). After opening the file system for use, one or more indexes in the one or more other nodes can be updated (1240) in response to the notifications being sent (1220).

The nodes that are processed (1205) can be all nodes in the file system that may have pending notifications, such as contained nodes in the file system. The one or more other nodes to which the notifications are sent (1220) can be container nodes. Updating (1240) the indexes can include updating them to reflect updates performed prior to a crash of the file system. Updating (1240) the indexes can include performing updates that reflect updates to previously-updated nodes, and updating (1240) the indexes can be independent of locks of the previously-updated nodes.

The techniques described above can be performed on various different systems and with various different computing environments, such as those described above. In addition, the techniques can be performed alone or in combination with other techniques. For example all or a portion of the different techniques may be combined with all or a portion of other techniques described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
    closing a file system to use;
    for each of one or more existing nodes in the file system:
        identifying one or more pending notifications of updates that have been performed on the node; and
        sending the one or more pending notifications to one or more other nodes, each of the one or more existing nodes and each of the one or more other nodes being a file or a directory in the file system while the file system is closed to use;
    opening the file system for use, the sending of the one or more pending notifications to the one or more other nodes occurring before the opening of the file system for use; and
    updating the one or more other nodes in response to the one or more pending notifications while the file system is open for use, the updating of the one or more other nodes while the file system is open for use being done in response to the one or more pending notifications being sent before opening the file system for use.

2. The method of claim 1, further comprising, for each of the one or more existing nodes, having the node ensure its own integrity.

3. The method of claim 2, wherein, for each of the one or more existing nodes, if one or more pending notifications were generated by the existing node in ensuring its own integrity, then identifying the one or more pending notifications for that existing node comprises identifying the one or more pending notifications that were generated by that existing node in ensuring its own integrity.

4. The method of claim 1, wherein identifying and sending the one or more pending notifications are performed while the file system is closed to use.

5. The method of claim 1, wherein identifying the one or more pending notifications and sending the one or more pending notifications for each of the one or more existing nodes are allowed to be done in parallel for different nodes.

6. The method of claim 1, wherein updating the one or more other nodes is allowed to be done in parallel for different nodes.

7. The method of claim 1, wherein the one or more existing nodes comprise a contained node, and for that contained node, sending the one or more pending notifications to one or more other nodes comprises sending the one or more pending notifications to one or more containing nodes that contain the contained node.

8. The method of claim 1, wherein updating the one or more other nodes comprises acquiring locks of the one or more other nodes.

9. The method of claim 1, wherein:
    identifying the one or more pending notifications, sending the one or more pending notifications, opening the file system for use, and updating the one or more other nodes are included in a file system recovery operation;
    the one or more pending notifications are one or more notifications that are scheduled to be sent when closing the file system to use is performed, but have not yet been confirmed as having been received when closing the file system to use is performed;
    all the one or more pending notifications are sent before opening the file system for use;
    identifying the one or more pending notifications is performed while the file system is closed to use; and
    updating the one or more other nodes comprises acquiring locks for each of the one or more other nodes.

10. A computer system comprising:
    at least one processor; and
    a memory comprising instructions stored thereon that when executed by the at least one processor cause the at least one processor to perform acts comprising:
        closing a file system to use;
        while the file system is closed to use, for each of one or more existing nodes in the file system:
            identifying one or more pending notifications of updates that have been performed on the node; and
            sending the one or more pending notifications to one or more other nodes, at least one of the one or more existing nodes being a file in the file system while the file system is closed to use, and at least one of the one or more other nodes being a directory in the file system while the file system is closed to use;
        opening the file system for use, the sending of the one or more pending notifications to the one or more other nodes occurring before the opening of the file system for use; and
        updating the one or more other nodes in response to the one or more pending notifications while the file system is open for use, the updating of the one or more other nodes while the file system is open for use being done in response to the one or more pending notifications being sent before opening the file system for use.

11. The computer system of claim 10, wherein the acts further comprise, for each of the one or more existing nodes, having the node ensure its own integrity.

12. The computer system of claim 11, wherein, for each of the one or more existing nodes, if one or more pending notifications were generated by the existing node in ensuring its own integrity, then identifying one or more pending notifications for that existing node comprises identifying the one or more pending notifications that were generated by that existing node in ensuring its own integrity.

13. The computer system of claim 10, wherein identifying the one or more pending notifications and sending the one or more pending notifications for each of the one or more existing nodes are allowed to be done in parallel for different nodes.

14. The computer system of claim 10, wherein updating the one or more other nodes is allowed to be done in parallel for different nodes.

15. The computer system of claim 10, wherein the one or more existing nodes comprise a contained node, and for that contained node, sending the one or more pending notifications to one or more other nodes comprises sending the one or more pending notifications to one or more containing nodes that contain the contained node.

16. The computer system of claim 10, wherein updating the one or more other nodes comprises acquiring locks of the one or more other nodes.

17. One or more computer-readable storage media having computer-executable instructions embodied thereon that, when executed by at least one processor, cause the at least one processor to perform acts comprising:

closing a file system to use;
   for each of one or more existing nodes in the file system:
   identifying one or more pending notifications of updates that have been performed on the node; and
   sending the one or more pending notifications to one or more other nodes,
   each of the one or more existing nodes and each of the one or more other nodes being a file or a directory in the file system while the file system is closed to use;
   opening the file system for use, the sending of the one or more pending notifications to the one or more other nodes occurring before the opening of the file system for use; and
   updating the one or more other nodes in response to the one or more pending notifications while the file system is open for use, the updating of the one or more other nodes while the file system is open for use being done in response to the one or more pending notifications being sent before opening the file system for use.

* * * * *